United States Patent [19]

Bunning

[11] 4,367,481
[45] Jan. 4, 1983

[54] DISPOSABLE PEN-RESERVOIR

[75] Inventor: John G. Bunning, Mission Viejo, Calif.

[73] Assignee: Esterline Angus Instrument Corporation, Indianapolis, Ind.

[21] Appl. No.: 249,167

[22] Filed: Mar. 30, 1981

[51] Int. Cl.³ .......................................... G01D 15/16
[52] U.S. Cl. .............................................. 346/140 A
[58] Field of Search ...................... 346/140 R, 140 A

[56] References Cited

U.S. PATENT DOCUMENTS

| | | | |
|---|---|---|---|
| 3,906,513 | 9/1975 | Siegelman et al. | 346/140 R |
| 4,017,871 | 4/1977 | Hubbard | 346/140 R |
| 4,164,744 | 8/1979 | Freude | 346/140 A |

Primary Examiner—Stafford D. Schreyer
Attorney, Agent, or Firm—Woodard, Weikart, Emhardt & Naughton

[57] ABSTRACT

A disposable pen-reservoir unit for a paper-chart recording instrument, includes a reservoir chamber surrounding the pen drive fork, with center of gravity of the unit located between the fork and writing tip, and the center of gravity below the line of bearing of the pen unit knife edge on the drive fork. Pen cross section is minimized. Reservoir diameter to depth ratio is minimized to keep the mass of the reservoir and ink supplies as close to the pen pivot axis as possible, to minimize inertia and dynamic over-shoot of the writing system. A closed system allows maximum utilization of ink supply with virtually no loss to evaporation.

14 Claims, 10 Drawing Figures

DISPOSABLE PEN-RESERVOIR

BACKGROUND OF THE INVENTION

1. Field of the Invention

This invention relates generally to instruments for making recordings on chart paper, and more particularly, to a pen and ink reservoir made in one unit complete with a supply of ink, and disposable as a unit when the ink supply has become exhausted.

2. Description of the Prior Art

For many years, recording instruments have been known which write with some type of pen on a chart paper. The pen is supplied with ink from a reservoir through a capillary tube. More recently, other means for marking charts have been devised. Nevertheless, pen-and-ink writing still produces a chart which has a good appearance, is easily read, provides a variety of color choices for the mark, and is relatively inexpensive. It is somewhat inconvenient because of occasional need for refilling the ink reservoir. This can be tedious and, in addition to the hazard of spills and splashes during the refilling process, can also result in some erratic chart marking due to pen bleeding or skipping for a short period after the refilling is accomplished.

One effort to avoid the need for refilling, is disclosed in U.S. Pat. No. 4,017,871 issued Apr. 12, 1977 to Hubbard. That patent discloses a marker with a three-phase ink circuit, wherein the entire marker and ink reservoir and circuit can be thrown away, after use. That patent discloses four versions.

There are many chart recording instruments in use today where a disposable pen-reservoir, would be beneficial. An example is the Esterline Angus Series "A" direct writing recorder which has been marketed by Esterline Angus of Speedway, Indiana. Efforts by others, both before and since my present invention, have been relatively unsuccessful in producing a disposable pen-reservoir suitable for use in these recorders.

It is therefore an object of the present invention to provide a disposable pen-reservoir suitable for direct-writing chart recording instruments. It is a further object to provide such a pen-reservoir suitable for use in the above-mentioned Esterline Angus recorders to replace the conventional stationary reservoir and capillary pen unit currently in use in the field.

SUMMARY OF THE INVENTION

Described briefly, according to a typical embodiment of the present invention, a disposable pen-reservoir unit is provided. An aperture which is in the reservoir portion of the unit, receives a pen fork of the recording instrument. A pivot bar extending across the aperture has a knife edge resting in pen fork slots. The writing tip is at a level below the knife edge level, as is the center of gravity. The center of gravity is located between the knife edge and writing tip so that the writing tip will always return to the chart medium, even if momentarily jarred away from it, and regardless of ink consumption during the life of the pen. The diameter to depth ratio is maximized within the space available, and the unit is closed to maximize utilization of ink supply with virtually no loss due to evaporation.

DESCRIPTION OF THE PREFERRED EMBODIMENT

Figure 1:
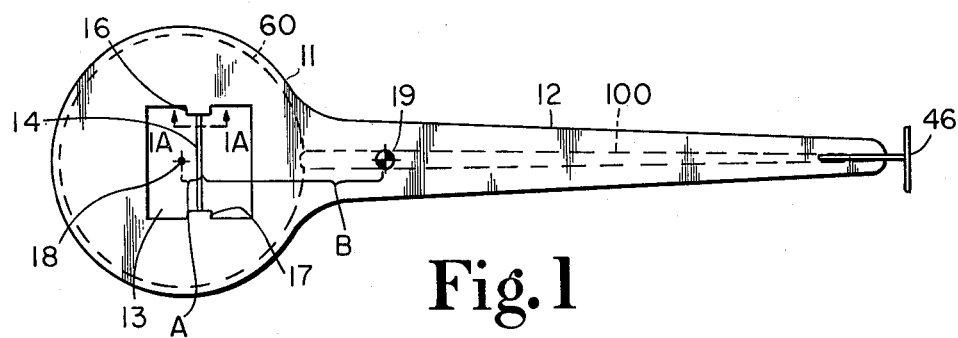
FIG. 1 is a top plan view showing a disposable pen-reservoir according to a typical embodiment of the present invention.

Referring now to the drawings in detail, FIG. 1 shows a top plan view of the disposable pen-reservoir. In this view it is somewhat banjo-shaped substantially hollow plastic unit, including the generally cylindrical reservoir portion 11 with inside wall designated by dotted line 60, and pen arm portion 12 projecting forwardly therefrom with ink wick passageway designated by dotted line 100. The reservoir portion has a central aperture 13 extending through it from top to bottom. It has a bar 14 extending across it from boss 16 to boss 17 of the aperture walls. The center 18 of the cylindrical reservoir portion 11 is spaced rearward from the bar a positive offset distance "A". The center of gravity of the unit is at 19 which is ahead of the bar by a distance "B".

Figure 5:
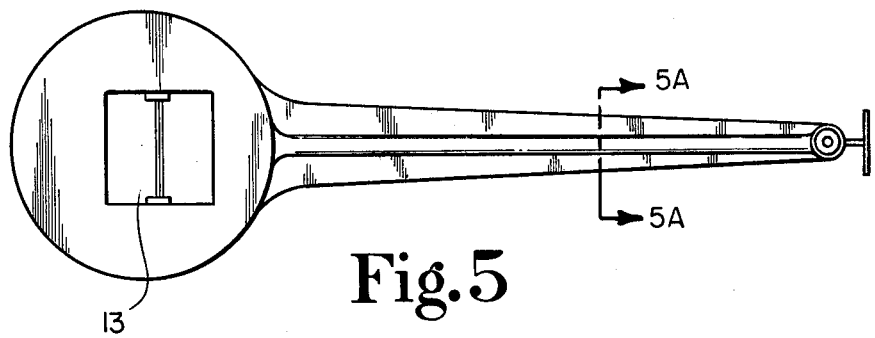
FIG. 5 is a bottom view thereof.
Figure 5A:
FIG. 5A is a cross section through the pen arm portion.
Figure 6:
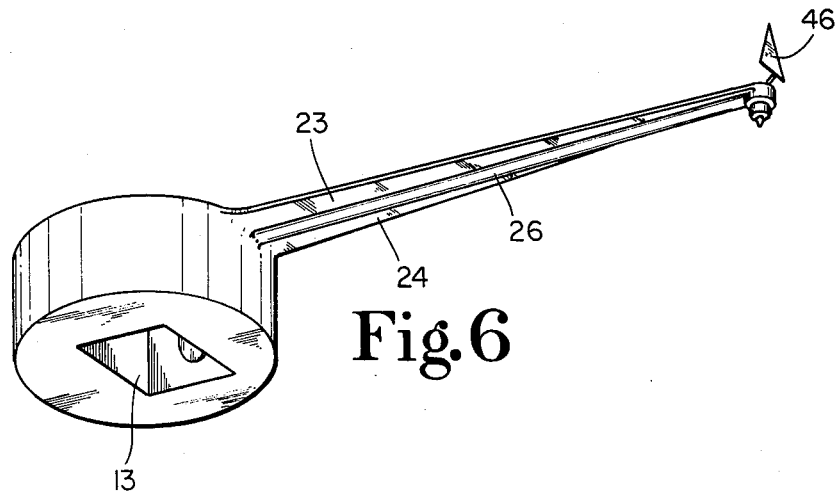
FIG. 6 is an isometric-type view thereof.

Referring now to FIGS. 2 through 6, one can see that the arm portion 12 has a writing tip 21 at its distal end. A comparison of FIGS. 2, 5 and 6 will reveal that the cross sectional shape of the arm is somewhat T-shaped, as best shown in FIG. 5A, having the horizontally extending flanges 23 and 24 providing rigidity in a horizontal direction, and the rib 26 providing some rigidity in the vertical direction.

Figure 7:
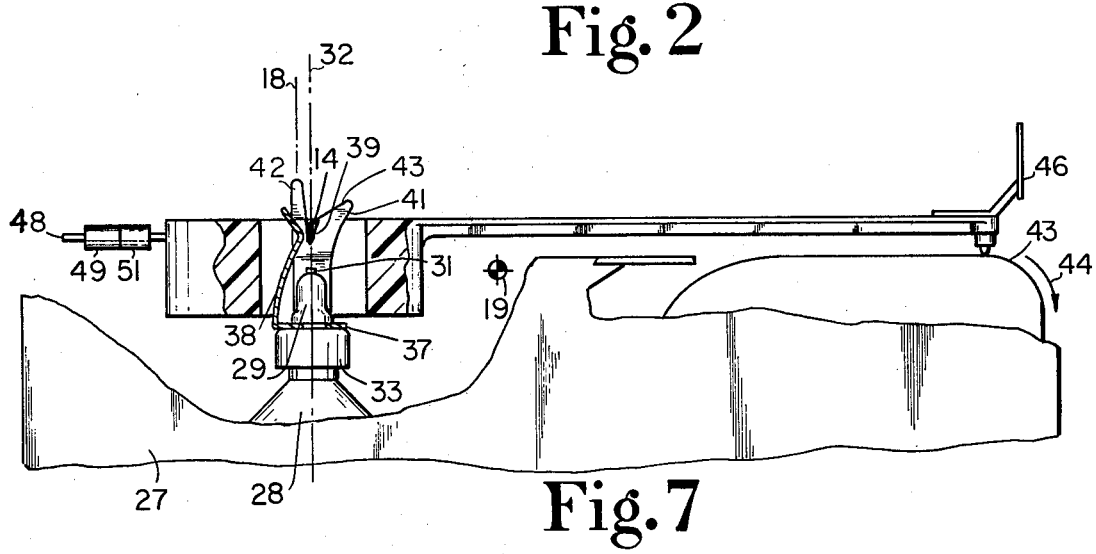
FIG. 7 is a fragmentary side elevational view of a recording instrument with the disposable pen-reservoir mounted to the pen fork.
Figure 8:
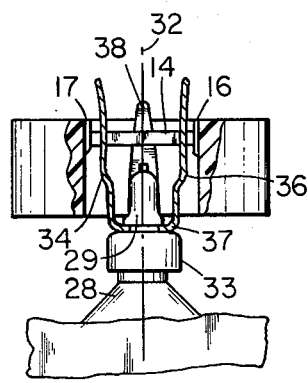
FIG. 8 is a front fragmentary section view thereof with the section through the pen-reservoir taken at the rotational axis of the pen fork.
Figure 3:
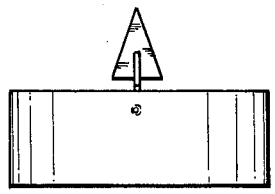
FIG. 3 is a rear end view thereof.
Figure 4:
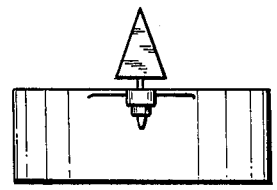
FIG. 4 is a front end view thereof.

Referring now to FIGS. 7 and 8, a recording instrument 27, of the above-mentioned Esterline Angus Series "A" type is shown having a pen drive motor generally designated at 28 driving a hub 29 which is secured to the shaft 31 projecting up from the motor. The shaft rotates about the axis 32.

A pen fork is provided with a horizontal base 37 secured between hub 29 and a protective cover in the form of an inverted cup 33, both of which rotate with the motor shaft 31. The pen fork includes a pair of arms 34 and 36 projecting up from the horizontal base portion 37 which encircles a portion of the hub 29 and is secured between the hub and collar. There is also a retainer spring clip 38 projecting from the rear of the same base portion 37 and which can be used to retain certain types of pens in the upwardly open slots 39 in each of the pen fork arms. If we refer to the arm portions defining the slot 39 as "tynes", the forward tyne 41 is lower than the back tyne 42 and has an upper edge 43 downwardly sloping to the slot 39. This feature facilitates placing a pen in the notch or slot from the front of the instrument, with the rear tyne serving as a stop.

Figure 1A:
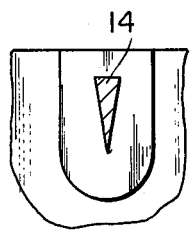
FIG. 1A is an enlarged fragmentary section through the pen pivot bar.
Figure 2:
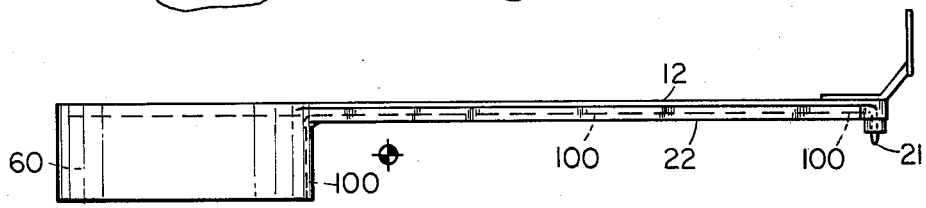
FIG. 2 is a side elevational view thereof.

The bar 14 of the pen-reservoir of the present invention has a knife edge at its bottom as best shown in FIG. 1A. This is disposed precisely on the center line 32 which is the axis of rotation of the pen drive motor. The bosses 16 and 17 limit side-to-side movement of the pen on the pen fork. The center line 18 of the cylindrical reservoir portion is behind the rotational axis 32 a short distance. This offset (distance "A" in FIG. 1) may be desirable to minimize the effect of any weight distribution change if such occurs as ink is consumed from the reservoir. If the reservoir is not cylindrical, or exterior or interior features make it appropriate, the amount of this offset can be increased, or decreased to zero or a negative value.

The chart paper is shown at 43 and the chart is normally driven in the direction of arrow 44. A target or pointer 46 is mounted at the top of the distal end of the pen point.

As noted above, the center of gravity is between the writing tip and the knife edge. This assures that, if the writing tip is bounced away from the paper momentarily, it will return to the paper and continue writing. In addition, as is best shown in FIG. 7, the center of gravity is below the level of the knife edge. Being below the points of contact of the knife edge of bar 14 with the bottoms of the receiver slots 39 in the pen fork, there is no likelihood that, even upon rapid pen movement about the pivot axis 32, the pen will be tipped off the paper or that the knife edges will move up from the bottoms of their respective slots.

With regard to specific internal features, the three-phase ink supply of the aforementioned Hubbard patent can be used. For reference purposes, referring to FIG. 1 of that patent and corresponding components in the preferred embodiment of the present invention, the reservoir material 6 of that patent can be employed in the cylindrical portion 12 as indicated by dotted line 60 in FIG. 2 herein; the intermediate capillary material 10 of that patent can be provided from cylindrical portion 12 through the rib portion 12 of the pen arm as shown dotted at 100; and the porous writing tip 12 of the patent can be employed for writing tip 21 of the present invention. Air venting in the reservoir chamber as at 38 in the above-mentioned patent, or along the writing tip as mentioned in the patent as prior art in disposable markers, can be employed. Venting in the reservoir chamber, seems preferable.

As indicated above, it is preferred that the reservoir portion and pen arm portion be so located with respect to the pen pivot bar 14, that the center of gravity is ahead of the pen pivot bar 14 at all times during operation, to keep the pen tip on the chart paper despite consumption of ink from the reservoir and any resulting tendency for the weight distribution to change. Nevertheless, if needed or desired, a counterbalance screw 48 (FIG. 7 only) can be secured in the reservoir wall and project to the rear in a plane extending from the pen writing tip through the center of gravity 19 and rotational center 32 of the pen drive motor. Counterbalancing weights 49 and 51 can be threaded onto the screw, and screwed together in abutting relationship to lock them in whatever position is desired, to achieve the desired pen writing pressure.

By making this inking system a "closed" system, i.e. no need for refilling, and allowing only enough air to enter the vent to avoid termination of ink flow, there is virtually no loss of ink due to evaporation. Efficient use of the ink results, so that a smaller reservoir provides more inches of chart record. In view of the fact that the mounting bar 14 in the pen-reservoir has a knife edge, it will pivot in a standard pen fork for maintaining the writing point in contact with the chart paper. A pliable plastic cap may be provided on the writing tip, to protect it when not in use and for storage and shipping. By keeping the arm length at a minimum, and its weight minimized by minimizing the cross sectional area, pen tip pressure can be minimized and thus avoid a deadband in the chart record of input signals detected by the instrument.

As examples of some dimensions, the dimension from the knife edge to the writing tip can be $4\frac{3}{8}$ inches. The dimensions of the aperture through the reservoir may be $\frac{3}{4}$ inch square. The overall depth of the reservoir portion may be $\frac{3}{4}$ but more likely $\frac{7}{8}$ of an inch. The exterior and aperture wall thickness thereof may be 0.030 to 0.040 inch. The writing tip is preferably 3/16 inch below the level of the knife edge. The overall depth may be chosen to accommodate different capacities, but the above-mentioned preference toward increasing depth and decreasing diameter is desirable, if possible, where increases of storage capacity are desired. Preferred capacity would be four to five cubic centimeters. The unit can be made several ways. One way would use two pieces of plastic, a base and cover, with the cover being installed and glued or otherwise secured to the base after the three capillary materials are installed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A disposable pen-reservoir device for a direct writing recording instrument comprising:
    a reservoir portion for ink storage;
    an arm portion having a proximal end at said reservoir portion, said arm portion projecting from said reservoir portion to a distal end for positioning a writing tip;
    an aperture extending up through said reservoir portion on a rotational axis of the pen-reservoir; and
    a pivot bar extending transversely of said aperture.
2. The device of claim 1 wherein:
    said pivot bar has a lower pivot edge.
3. The device of claim 2 wherein:
    said pivot edge is a knife edge.
4. The device of claim 1 wherein:
    said reservoir portion has a first capillary material of one capillarity therein, said arm has a second capillary material of a second capillarity extending from the first capillary material;
    a writing tip is located at said distal end, said writing tip having a third capillary material of a capillarity different from the capillarity of said second and first materials and communicating with said second material to accommodate passage of ink from said first material in said reservoir, through said second material and through said third material to the chart medium.
5. The device of claim 1 wherein:
    a writing tip is on the distal end, and the center of gravity is between the writing tip and the pivot bar.

6. The device of claim 5 wherein:

said center of gravity is at a level below the pivot bar.

7. The device of claim 6 wherein:

said reservoir portion includes a generally cylindrical wall centered about a point;

said pivot bar is spaced from said point in a direction toward said writing tip.

8. The device of the claim 7 wherein:

said bar is between the center of gravity and the geometrical center of said reservoir portion.

9. The device of claim 1 wherein:

the mass of said arm portion is minimal, and the depth of said reservoir portion is maximized with respect to the cross sectional maximum dimension of said reservoir portion.

10. The device of claim 1 wherein:

said reservoir portion contains an ink saturated capillary material substantially surrounding said aperture.

11. In a chart recording instrument, the combination comprising:

pen drive motor means;

pen mounting fork means coupled to said drive motor means;

a reservoir chamber member having a central aperture received over said pen fork means;

and a pivot bar secured to said member and extending across said aperture and received and pivoting in said fork means;

an arm portion projecting from said reservoir chamber having pen means at a distal end.

12. The combination of claim 11 wherein:

said fork means includes a pair of upstanding horizontally spaced arms, with upwardly opening parallel slots therein; and said pivot bar extends across and is mounted in said slots, said pivot bar being mounted in said central aperture outboard of said arms.

13. The combination of claim 12 wherein:

the pivot axis of said pivot bar in said pen fork means intersects a rotational axis of said fork means at 90°.

14. The combination of claim 11 wherein:

said reservoir chamber contains a capillary material substantially surrounding said aperture.

* * * * *